United States Patent [19]
Fields et al.

[11] Patent Number: 6,129,103
[45] Date of Patent: Oct. 10, 2000

[54] TIMED CONTROL VALVE AND METHOD OF USING THE SAME

[76] Inventors: Acie R. Fields, 919 New Haven Church Rd., Danielsville, Ga. 30633; Larry S. Cutshaw, 1025 Whit Davis Rd., Athens, Ga. 30605

[21] Appl. No.: 09/396,256

[22] Filed: Sep. 15, 1999

[51] Int. Cl.[7] .................................................. F16K 31/02
[52] U.S. Cl. ...................... 137/1; 137/624.12; 137/613; 239/70
[58] Field of Search ................... 137/624.11, 624.12, 137/624.13, 624.15, 613, 1; 239/69, 70

[56] References Cited

U.S. PATENT DOCUMENTS

| | | | |
|---|---|---|---|
| 4,249,565 | 2/1981 | Brust | 137/624.11 X |
| 4,589,435 | 5/1986 | Aldrich | 137/624.12 X |
| 4,926,901 | 5/1990 | Waltenburg | 137/624.12 X |
| 5,402,812 | 4/1995 | Moineau et al. | 137/624.12 X |

*Primary Examiner*—Kevin Lee
*Attorney, Agent, or Firm*—James L. Sherman

[57] ABSTRACT

A timed control valve is of the type that is installed in a fluid line upstream from a regular valve and capable of being physically oriented an any direction in the fluid line. The timed control valve is capable of sensing at least the normal flow of fluid when the regular valve is opened, stopping the normal flow at an end of a first predetermined period of time beginning with an initial sensing of the normal flow; and then allowing the normal flow at an end of a second predetermined period of time beginning with an initial stopping of the normal flow. Various embodiments of the timed control valve include different sensing and timing device for regulating the overall amount of the fluid that can be used and can even be configured to protect against a major loss of fluid if there is a rupture or failure of the fluid line down stream of the timed control valve. The invention also includes the method of doing the same.

26 Claims, 4 Drawing Sheets

TIMED CONTROL VALVE AND METHOD OF USING THE SAME

BACKGROUND OF THE INVENTION

1. Field of the Invention

This invention relates to a timed control valve of the type that is installed in a fluid line upstream from a regular valve and, more specifically, to such a timed control valve which is capable of sensing at least the normal flow of fluid when the regular valve is opened, stopping the normal flow at an end of a first predetermined period of time beginning with an initial sensing of the normal flow, and then allowing the normal flow at an end of a second predetermined period of time beginning with an initial stopping of the normal flow.

2. Brief Description of the Prior Art

It is not uncommon for a primary use of energy in a typical household to be the hot water heater. Because of the desire to save energy and to save a significant amount of money on their utility bills, it is quite common for families to be a concerned with the unnecessary use of hot water. While all the members of the family may recognize the desire for shorter and more efficient use of showers, attempts to reduce the use of hot water in this manner require some attention and are not always successful. Accordingly, to insure that the various members of the family are able to limit the use of the hot water when taking a shower, there have been devised various schemes and devices to minimize the amount of hot water which is available for use during a shower.

To generally discourage the excessive use of hot water and to conserve energy, U.S. Pat. No. 4,262,842 discloses an entire timer apparatus that is enclosed inside a special hot water control knob. When the special control knob is rotated to turn the hot water on, the timer is activated. After predetermined time intervals, various visual and audio alarms are activated to encourage the conservation of energy by using less hot water.

On the other hand, a number of devices and systems have heretofore been employed to positively reduce or control the amount of or time for the use of the water. For example, U.S. Pat. No. 4,351,360 includes a mechanical timer that can be mounted near a tap or sprinkler to regulate the amount of time that water will flow therethrough.

For use in a single shower configuration, U.S. Pat. Nos. 4,282,899 and 4,345,621 disclose shower head valve assemblies for saving the amount of water used therein. Each assembly provides a timed cycle which allows water flow for wetting and then turns off for soaping. When the assembly turns on the flow again, it is for a preset period for rinsing. The assembly includes a rotatable ball set in a valve chamber that is controlled by a manually set spring operated timer which is wound to set the timer and valve in operation.

U.S. Pat. No. 5,402,812 is also intended for use with a single shower at the shower head thereof. It utilizes a timed water control shower valve that includes a mechanical timer that only allows the water to flow during a first predetermined period of time and can not be re-activated after the first period of time until a second period of time has expired. The timer has a feature that allows the user to temporarily discontinue the flow of the water from the shower to allow, for example, a period of lathering without water, during which the timer is delayed to allow full use when flow is resumed.

U.S. Pat. No. 4,867,189 discloses a water flow control system that is also intended to limit the time that one can use a single shower. It specifically includes a pair of timers and a solenoid operated valve. The first timer controls the length of time water flows through the shower by energizing and deenergizing solenoids. The second timer prevents the solenoids from being energized for a predetermined time period after the first timer has turned the water off to prevent the shower from being turned on again until the time period has elapsed. A person taking a shower activates the system and starts the shower by pushing a button that is located conveniently to the shower although the means for setting the various times may be located out of reach of the bather.

U.S. Pat. Nos. 4,282,899; 4,345,621; 4,867,189; and 5,402,812 all appear to be configured for use with the entire shower watering system and not limited to the hot water. Additionally, they each require some activation by the user which is different from and independent of the regular hot water and cold water valves that are typically used in showers for the regulation and control of the flow rate and temperature of the water.

The devices and systems discussed above are primarily controlled by time in a manner which is independent of the actual flow of water therethrough. However, U.S. Pat. No. 4,846,222 discloses a volume flow control device which uses an impeller to sense the flow of the water therethrough and to close the valve after a specific volume has been sensed. The device, like most of those discussed above, must be located in an accessible place so that the user is able to set the controls to initiate the flow therethrough.

U.S. Pat. No. 5,000,224 discloses a hydraulically actuated shut-off valve that is controlled by a solenoid actuated control valve. An associated flow detection unit includes a member movable by water that flows through a flow passage to actuate a flow detection switch thereof. The flow detection switch is connected to a control box that is preferably mounted on the flow detecting unit and has a timer and a reset switch therein which are capable of sending electrical control signals to the solenoid actuator of the control valve. The timer senses the condition of the flow detection switch and, upon sensing that the switch has been closed a predetermined period of time which suggests abnormal water flow, possibly due to a leak in the system, sends a signal to the solenoid to actuate the control valve to cause the shut-off valve to close, preventing further water flow. The reset switch can be used to send a reverse signal to the solenoid to cause the shut-off valve to open. The shut-off valve can not be opened without physical access to and manual activation of the reset switch. The flow detection unit has a substantially vertical inlet and flow passage and employs a substantially horizontal outlet that is connected to the horizontal inlet of the shut-off valve. It is clear that the configuration is very directional sensitive and that the entire operation depends on the proper orientation of the device. Accordingly, since the intended use is to simply prevent extended flow of water or fluid if some valve down stream is left open, it is not configured or readily adapted for use in a typical household water piping system that is installed in a limited space or restricted area.

OBJECTS OF THE INVENTION

It is an object of the present invention to provide a timed control valve that can be utilized to limit the time that water or fluid can be used in a flow system.

It is another object of the invention to provide such a timed control valve that will be activated for the timed closure thereof by the simple use of the regular valve in the system.

It is a further object of the invention to provide such a timed control valve which includes components which are capable of being easily adapted to existing piping systems and functioning independently of the physical location or orientation thereof.

It is yet another object of the invention to provide such a timed control valve that includes a configuration that can be conveniently pre-set or regulated but tends to insure that additional water or fluid will not be easily obtained in a manner contrary to the desired settings or regulations.

It is still another object of the invention to provide such a timed control valve that is relatively inexpensive to provide, easy to install, and simple to maintain.

These and other objects of the invention are provided by a preferred embodiment thereof that includes a timed control valve of the type that is installed in a fluid line upstream from a regular valve which is capable of being opened to allow a fluid to flow through the fluid line and closed to prevent the fluid from flowing through the fluid line with the regular valve in the fluid line being capable of allowing at least a normal flow of the fluid therethrough. The control valve includes a housing having an inlet portion for being connected to the fluid line for receipt of the fluid therefrom and an outlet portion for being connected to the fluid line for the discharge of the fluid thereto toward the regular valve. A valve element in the housing is for normally being in an open position for at least the normal flow of the fluid to pass therethrough and for alternatively being in a closed position for preventing the normal flow of the fluid therethrough. A sensing element is disposed at one of the inlet portion and the outlet portion for sensing at least the normal flow of the fluid. The sensing device is capable of being physically oriented in any direction while sensing the normal flow therethrough. A valve element control is for controlling the open position and the closed position of the valve element. The valve element control includes a timing device. The sensing element is operably connected to the valve element control to cause a beginning of a first predetermined period of time of the timing device when at least the normal flow is sensed by the sensing element. The valve element control causes the valve element to be moved to the closed position at an end of the first predetermined period of time. A selective opening feature is for selectively opening the valve element after the valve element has been closed by the valve element control.

One preferred selective opening feature includes the timing device having a second predetermined period of time beginning at the end of the first predetermined period of time with the valve element control causing the valve element to be opened at an end of the second predetermined period of time. In the preferred timed control valve, the timing device includes an adjustment feature for selectively adjusting the first predetermined period of time and for selectively adjusting the second predetermined period of time.

The timed control valve can further include the valve element in the closed position allowing a reduced flow of the liquid therethrough which is less than the normal flow. The sensing element is only capable of sensing the flow of the fluid therethrough which is at least the normal flow and is above the reduced flow.

In one embodiment, the valve element control causes the valve element to be moved to the closed position after a shortened period of time prior to the end of the first predetermined period of time when at least the normal flow is no longer being sensed by the sensing element. The selective opening feature includes the timing device having a second predetermined period of time equal to the shortened period of time beginning when the valve element is moved to the closed position and the valve element control causes the valve element to be opened at an end of the second predetermined period of time.

In one form of this embodiment, the sensing element includes a magnetic element disposed in the one of the inlet portion and outlet portion with the magnetic element normally biased by a biasing element in a direction opposite the normal flow. The magnetic element is caused to move at least to a predetermined position in the one of the inlet portion and outlet portion against the biasing element by the normal flow of the fluid acting thereon. The sensing element includes a reed switch adjacent to the predetermined position in the one of the inlet portion and outlet portion and the magnetic element at the predetermined position causes the reed switch to be closed to provide indication of at least the normal flow to the valve element control.

In another embodiment of the invention, the sensing element is for sensing at least a reduced flow of the fluid which is less than the normal flow. The sensing element is operably connected to the valve element control to cause the beginning of the first predetermined period of time of the timing device when at least the reduced flow is sensed by the sensing element. The valve element in the closed position allows at least the reduced flow therethrough. The sensing element includes a magnetic element disposed in the one of the inlet portion and outlet portion. The magnetic element is normally biased by a biasing element in a direction opposite the normal flow. The magnetic element is caused to move at least to a predetermined position in the one of the inlet portion and outlet portion against the biasing element by at least the reduced flow of the fluid acting thereon. The sensing element includes a reed switch adjacent to the predetermined position in the one of the inlet portion and outlet portion. The magnetic element at the predetermined position causes the reed switch to be closed to provide indication of at least the reduced flow to the valve element control. The selective opening feature includes the timing device having a second predetermined period of time beginning when the at least the reduced flow is no longer being sensed by the sensing element. The valve element control causes the valve element to be opened at an end of the second predetermined period of time.

The preferred magnetic element of the sensing element is disposed in the outlet portion. The preferred valve element control is electrically operated and the sensing element is electrical with the operable connection between the sensing element and the valve element control being electrical.

In another preferred embodiment of the invention, a timed control valve is of the type that is installed in a fluid line upstream from a regular valve which is capable of being opened to allow a fluid to flow through the fluid line and closed to prevent the fluid from flowing through the fluid line. The regular valve in the fluid line is capable of allowing at least a normal flow of the fluid therethrough. The control valve includes a housing having an inlet portion for being connected to the fluid line for receipt of the fluid therefrom and an outlet portion for being connected to the fluid line for the discharge of the fluid thereto toward the regular valve. A valve element in the housing is for normally being in an open position for at least the normal flow of the fluid to pass therethrough and for alternatively being in a closed position for preventing the normal flow of the fluid therethrough. A valve element control is for controlling the open position and the closed position of the valve element. A sensing element is disposed at one of the inlet portion and the outlet portion for sensing at least the normal flow of the fluid. The sensing element is operably connected to the valve element control. The sensing element is capable of being physically oriented in any direction while sensing at least the normal flow therethrough. The sensing element includes a magnetic element disposed in the one of the inlet portion and the outlet portion. The magnetic element is normally biased by a biasing device in a direction opposite the normal flow. The magnetic element is caused to move at least to a predetermined position in the one of the inlet portion and the outlet portion against the biasing device by at least the normal flow of the fluid acting thereon. The sensing element includes a reed switch adjacent to the predetermined position in the one of the inlet portion and the outlet portion. The magnetic element at said predetermined position causes the reed switch to be closed to provide indication of at least the normal flow to the valve element control. The valve element control includes a timing device. The sensing element is operably connected to the timing device to cause a beginning of a first predetermined period of time of the timing device when at least the normal flow is sensed by the sensing element. The valve element control causes the valve element to be moved to the closed position at an end of the first predetermined period of time. A selective opening feature is for selectively opening the valve element after the valve element has been closed by the valve element control.

The preferred selective opening feature in this embodiment includes the timing device having a second predetermined period of time beginning at the end of the first predetermined period of time. The valve element control causes the valve element to be opened at an end of the second predetermined period of time. The timing device includes an adjustment feature for selectively adjusting the first predetermined period of time and for selectively adjusting the second predetermined period of time.

In one form of this embodiment, the valve element control causes the valve element to be moved to the closed position after a shortened period of time prior to the end of the first predetermined period of time when at least the normal flow is no longer being sensed by the sensing element. The selective opening feature includes the timing device having a second predetermined period of time equal to the shortened period of time beginning when the valve element is moved to the closed position and the valve element control causes the valve element to be opened at an end of the second predetermined period of time.

In another form of this embodiment of the invention, the sensing element is for sensing at least a reduced flow of the fluid which is less than the normal flow. The sensing element is operably connected to the valve element control to cause the beginning of the first predetermined period of time of the timing device when the at least the reduced flow is sensed by the sensing element. The valve element in the closed position allows at least the reduced flow therethrough. The sensing element includes a magnetic element disposed in the one of the inlet portion and outlet portion. The magnetic element is normally biased by a biasing element in a direction opposite the normal flow. The magnetic element is caused to move at least to a predetermined position in the one of the inlet portion and outlet portion against the biasing element by at least the reduced flow of the fluid acting thereon. The sensing element includes a reed switch adjacent to the predetermined position in the one of the inlet portion and outlet portion. The magnetic element at the predetermined position causes the reed switch to be closed to provide indication of at least the reduced flow to the valve element control. The selective opening feature includes the timing device having a second predetermined period of time beginning when the at least the reduced flow is no longer being sensed by the sensing element. The valve element control causes the valve element to be opened at an end of the second predetermined period of time.

Further, the valve element in the closed position in this basic embodiment can allow a reduced flow of the liquid therethrough which is less than the normal flow and the sensing element is only capable of sensing the flow of the fluid therethrough which is above the reduced flow.

In any of the embodiments discussed above, the valve element control can be electrically operated, the sensing element can be electrical and the operable connection between the sensing element and the valve element control can be electrical. The magnetic element of the sensing element can be disposed in the outlet portion.

In another preferred embodiment of the invention, there is provided a method of limiting the amount of time of at least a normal flow of a fluid through a fluid line which includes a regular valve capable of being opened to allow the fluid to flow through the fluid line and closed to prevent the fluid from flowing through the fluid line. The regular valve in the fluid line is capable of allowing at least the normal flow of the fluid therethrough. The method comprises the steps of: sensing at least the normal flow of the fluid through the fluid line; the sensing being capable of occurring independent of the physical orientation of the fluid line and the normal flow therethrough; and stopping the normal flow at least at an end of a first predetermined period of time of continuous such sensing of at least the normal flow.

The steps of sensing and stopping can be produced by electrically operated components.

In the preferred method, the stopping of the normal flow can allow a reduced flow of the fluid which is less than the normal flow and the sensing can occur at the reduced flow of the fluid. Further, the method can include the step of allowing at least the normal flow when the regular valve is opened at an end of a second predetermined period of time beginning with the stopping of the reduced flow.

The steps can further include allowing at least the normal flow when the regular valve is opened at an end of a second predetermined period of time beginning with the stopping of the normal flow. Additionally, the stopping of the normal flow allows a reduced flow of the fluid which is less than the normal flow. In the preferred method, the sensing does not occur during the reduced flow of the fluid. The method can further include the step of adjusting a length of the first predetermined period of time and a length of the second predetermined period of time.

In one form of the preferred method, the step of stopping the normal flow occurs after a shortened period of time prior to the end of the first predetermined period of time when there is no sensing of at least the normal flow. The method further includes the step of allowing at least the normal flow at an end of a second predetermined period of time which is equal to the shortened period of time and begins at the time of the stopping of the normal flow.

DETAIL DESCRIPTION OF THE PREFERRED EMBODIMENTS

Figures 1, 2:
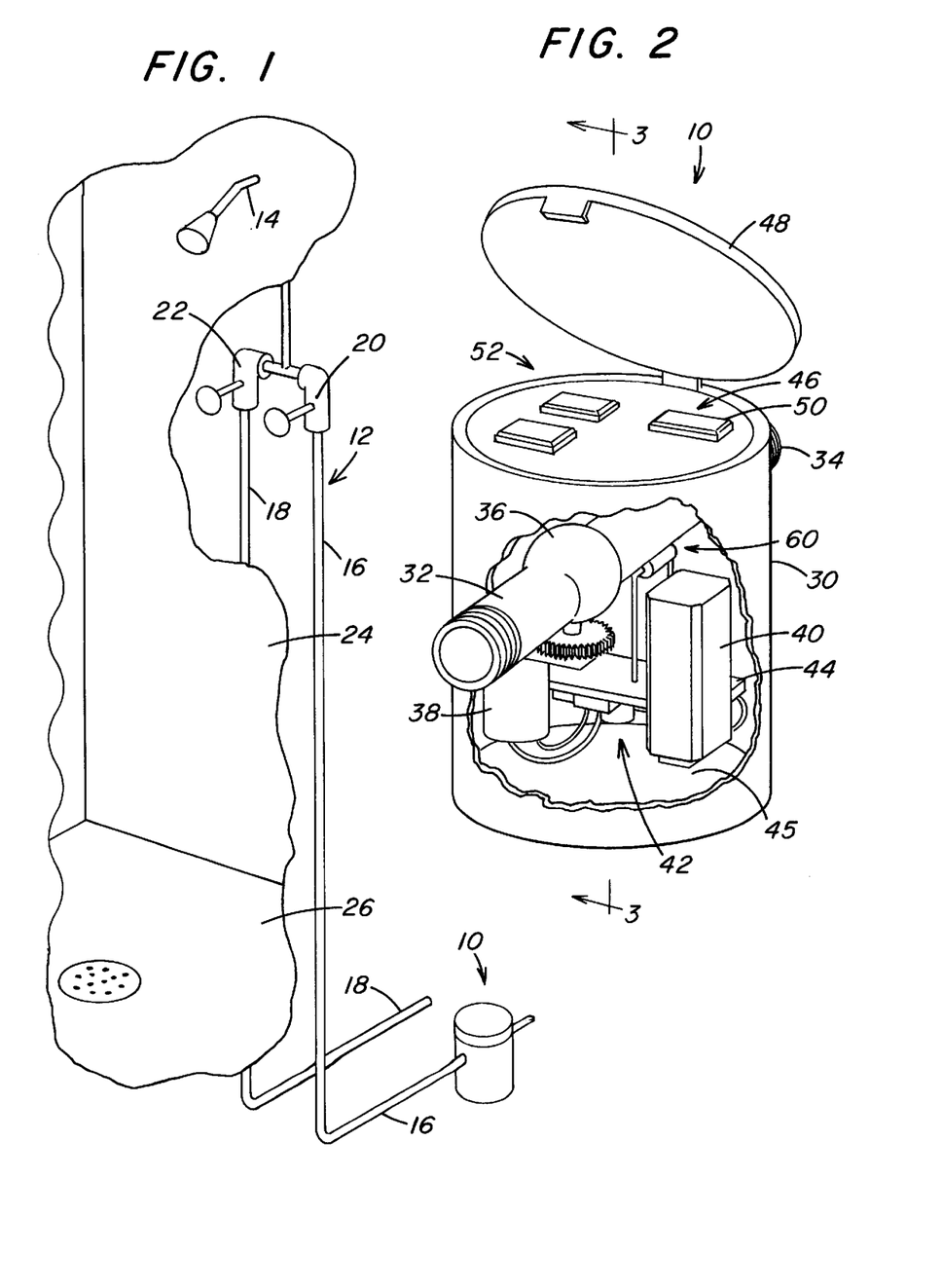
FIG. 1 is a fragmentary, perspective view of a typical shower installation which employs the preferred timed control valve and includes various features of the invention.
FIG. 2 is a fragmentary, perspective view of the preferred timed control valve including various features of the invention.

As seen in FIG. 1, a preferred timed control valve 10 is installed for use in a typical shower installation 12 having a spray nozzle outlet 14. The nozzle outlet 14 is connected to a hot water line 16 and cold water line 18 which are respectively controlled by regular hot water valve 20 and cold water valve 22. The valves 20, 22 are of the type which can be adjusted for the desired amount of water to be discharged from the nozzle outlet 14 and at the desired combined temperature according to the relative flow of the hot water and cold water. Without the preferred timed control valve 10 or some other flow control and timing means, such a configuration would allow the unfettered use of hot water that could result in significant energy consumption which the present invention is intended to correct.

The timed control valve 10 is preferably installed in the hot water line 16 in a location that is up stream of the regular valve 20. Because the timed control valve 10 is only intended to reduce or control the use of the hot water from the hot water line 16, there is nothing in the preferred configuration that would prevent the person taking a shower from unlimited use of the cold water through the valve 22. As will be seen, the preferred timed control valve 10, and the method of using the same, will tend to regulate the use of the hot water in a manner that can not be easily or readily overcome or defeated. As seen with a number of the prior art devices discussed hereinabove, it is not uncommon for a device or system which is being used to control the time or amount of hot water or total shower water to be readily accessible to the user and thus more likely to be defeated if desired.

However, with the preferred timed control valve 10 being up stream of the regular hot water valve 20, it can be installed at any location between the hot water heater (not shown) and the regular valve 20. In a typical installation of FIG. 1, the hot water line 16 extends downwardly behind the shower wall 24 and into the basement or accessible crawl space area below the main floor 26. It should be clear that such a location would enable the valve 10 to be conveniently installed in a new installation or added to modify an existing piping system if desired. In the particular configuration of FIG. 1, the valve 10 is installed in a horizontal section of the hot water pipe 16 with the controls located on the upper portion thereof for easy access when setting and regulating the desired use of the valve 10.

As seen in FIGS. 2, 3, 4, 5 and 6, the preferred timed control valve 10 includes a housing 30 having an inlet portion 32 for being connected to the water line 16 for receipt of the water from the hot water heater and an outlet portion 34 for being connected to the water line 16 for the discharge of the hot water thereto toward the regular valve 20. The timed control valve 10 includes a ball valve element 36 between the inlet portion 32 and outlet portion 34 which is capable of being located at an open position by a motor 38 to allow hot water to flow therethrough to the regular hot water valve 20. With the ball valve element 36 in the open position, the hot water valve 20 is manually positioned by the user to be capable of allowing at least a "normal" flow of the hot water therethrough. When the ball valve element 36 is in the closed position, it will prevent the "normal" flow rate of the water therethrough even if the regular valve 20 is completely opened. Accordingly, the ball valve element 36 in the housing 30 is for normally being in an open position for allowing at least the normal flow of the water to pass therethrough and for alternatively being in a closed position for preventing the normal flow of the water therethrough.

To accomplish this objective, the housing 30 includes a power source 40 which is preferably a 9-volt battery but could alternatively be provided, if desired for a particular installation, from normal house power by those skilled in the art. The power source 40 is used to provide energy for the operation of a valve element control means 42 which, in the preferred valve 10, includes a printed circuit board 44 which is installed within the housing 30. The valve element control means 42 is primarily intended for controlling, by the selective activation and deactivation of the motor 38, the open position and the closed position of the ball valve element 36. With the preferred valve element control means 42, the power source 40 is configured to only provide the operating power to the motor 38 when the ball valve element 36 is being opened or is being closed. Since no operating power is required once the ball valve element 36 is actually closed or opened, the overall configuration is intended to prevent unnecessary depletion of the power source 40. The housing 30 includes a removable bottom 45 for access to the motor 38, valve element control means 42 and to allow the battery of the power source 40 to be changed.

In order to limit the time that the hot water can be used and to prevent it from being used again too soon after the initial use, the valve element control means 42 includes electronic timing means (not shown since it is included as a designed component of the printed circuit board 44), which can be set or regulated by an associated control panel 46 installed on the housing 34 below a hinged lid 48 thereof. With the basic objective of setting a first time limit for initial use and setting a second time limit for preventing a second use after the completion of the first use, the preferred valve 10 may not appear to be that different from the prior art devices discussed above. However, the location of the valve 10, the configuration of the valve element control means 42 and the overall operation thereof allow an activation and presetting which are not possible with the prior art devices.

In its most basic form, the electronic timing means of the valve element control means 42 is not initially activated by the manual turning of a timer at the shower head or the manual pushing of a button in the shower but by the user simply opening of the regular hot water valve 20 for the regulation thereof in the same manner as if the valve 10 were not installed. As discussed above, unlike the devices and systems of the prior art, the valve 10 is by design located in an area which is generally inaccessible to one using the shower. Accordingly, the user or head of the household would not be expected to set the timing means just prior to or at the time of each intended use of the shower for regulating either the desired shower time or the desired delay time for the next use of the shower. Instead, the user or head of the household would, on a one-time basis, gain access to the valve 10 at the remote location thereof and use the control panel 46 to basically establish the desired shower time and the desired delay time for all subsequent uses of the shower until a determination is made to change either the shower time and/or the delay time for all future showers.

Basically, the control panel 46 includes an off-on power button 50 which will be used to connect the power source 40 to the valve element control means 42 to activate the timing means and other components thereof for the planned operation of the valve 10. Additionally, the control panel 46 includes setting button means 52 which can be used to adjust the first predetermined period of time for using the shower and the second predetermined period of time of the delay between the first use of the shower and the next. The preferred setting button means 52 may include a first button for setting the first predetermined period of time and a second button for setting the second predetermined period of time. As will be seen, those skilled in the electronic control art would be able to devise or design the valve element control means 42 and/or control panel 46 in any number of alternative configurations, some of which will be discussed hereinbelow, to accomplish the desired objectives.

However, in the most basic form, the first button, for example, would be configured to set the first predetermined period of time and the second button to set the second period of time in increments of five minutes up to a total of twenty-five minutes. With the power button turned "off" and then turned "on" again to reset the first and second buttons, the first button would be pushed twice to establish a first predetermined period of time of ten minutes and the second button could be pushed three times to establish a second predetermined period of time of fifteen minutes.

With the first and second periods of time established, the preferred timed control valve 10 includes a unique means for determining when each period of time will actually begin. A preferred flow sensing means 60 in the housing 30 is disposed at outlet portion 34 and is configured to sense at least the "normal" flow of the water that is produced when the valve 20 is manually opened. The overall design of the sensing means 60 and the valve 10 is such that the flow rate that is considered "normal" and would be sufficient to be sensed by the sensing means 60 will be quite low when compared to the typical flow rate that would be used during a shower. In other words, while a typical flow rate of hot water during a shower might be one to three gallons per minute, the "normal" flow that would, by design, be sensed by the sensing means 60 would be as low as one-fourth of a gallon per minute.

Figure 3:
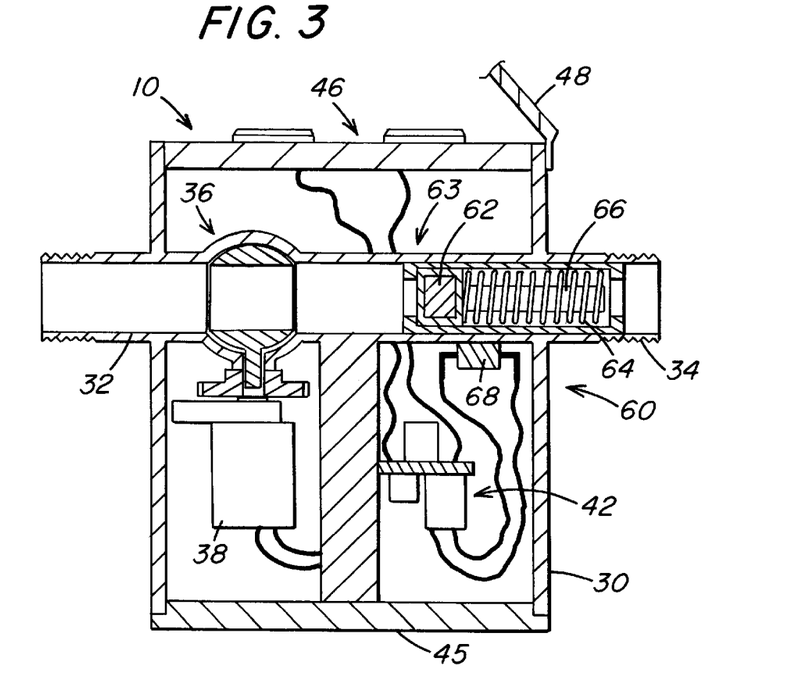
FIG. 3 is a view of the timed control valve of FIG. 2 as seen along Line 3—3 without any fluid flow therethrough.

The sensing means 60 is operably connected to the valve element control means 42 and the electronic timing means thereof to cause a beginning of a first predetermined period of time when at least the normal flow is sensed by the sensing means 60. To accomplish this objective, the preferred sensing means 60 includes a magnetic element 62 that is disposed in the flow path within the outlet portion 34. The magnetic element 62 is normally biased by a biasing spring 64 in a direction in opposition to flow to a "no flow" position 63 as seen in FIG. 3. Although the ball valve element 36 is shown in the open position in FIG. 3, the regular valve 20 would be closed to prevent any flow through the valve 10.

Figure 4:
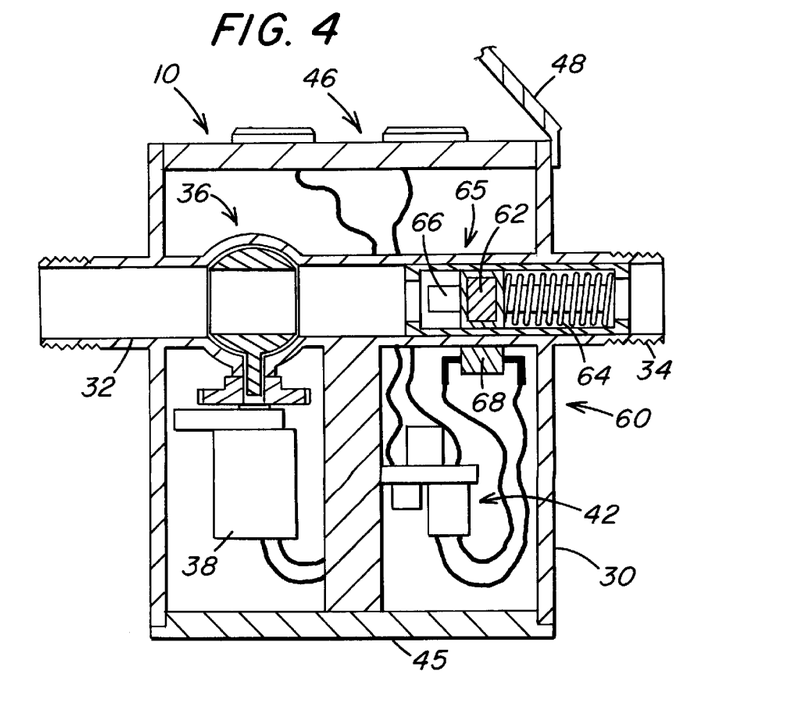
FIG. 4 is a view like that of FIG. 3 with at least a normal flow of fluid therethrough.

As seen in FIG. 4 when the valve 20 is opened, the water in the hot water pipe 16 nearest the shower outlet 14 would be discharged at a low rate to create a differential pressure on the magnetic element 62 that would, by design according to the normal flow, tend to force it "down stream" against the biasing spring 64 acting thereon. When the differential pressure for normal flow is obtained, magnetic element 62 will be caused to move against the biasing spring 64, toward the right as seen in FIG. 4, to a predetermined "flow" position 65 in the outlet portion 34. When in the "flow" position 65, the magnetic element 62 will be in alignment with slot means 66 in the outlet portion 34 to allow the water to flow unobstructed around the magnetic element 62 so that the user will be able to freely regulate the typical flow with the valve 20 which is well above the normal flow. It is expected that any typical flow rate that is selected or established for the use of the shower will be above the normal flow and will cause the magnetic element 62 to remain at the "flow" position against the biasing spring 64.

In addition to the magnetic element 62, the sensing means 60 includes a reed switch 68 which is adjacent to the predetermined "flow" position 65 in the outlet portion 34 and is operably connected to the valve element control means 42 and the timing means thereof. The magnetic element 62 at the predetermined "flow" position 65 will cause the reed switch 68 to be closed to provide an indication to the valve element control means 42 and the timing means thereof of at least the normal flow of the hot water through the valve 10 and to cause the first predetermined period of time to begin.

Figure 5:
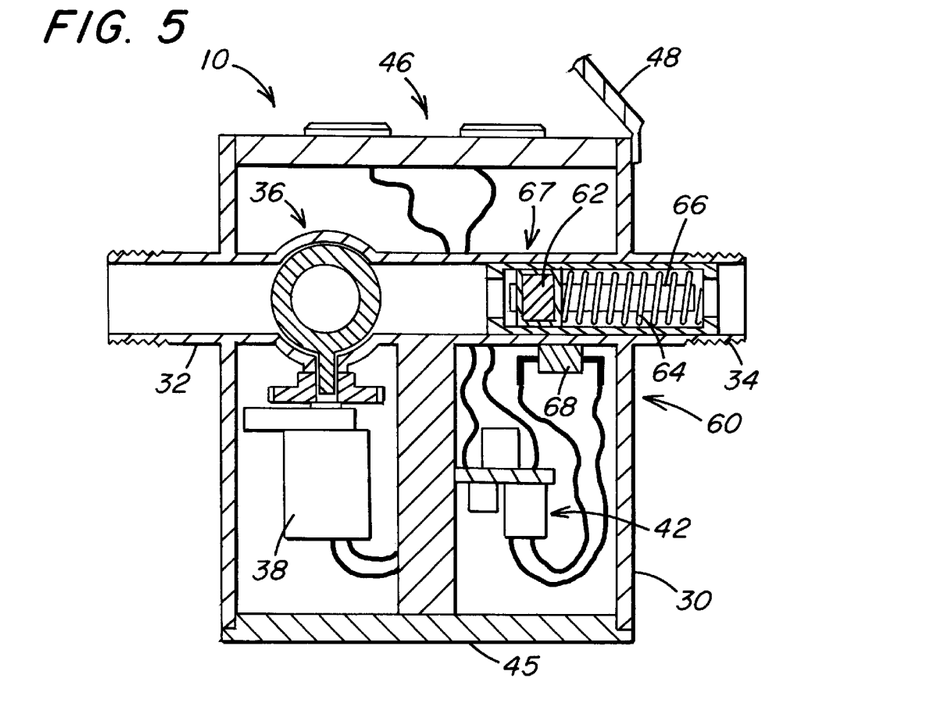
FIG. 5 is a view like that of FIG. 3 with the timed control valve closed to allow a reduced flow of fluid therethrough.
Figure 6:
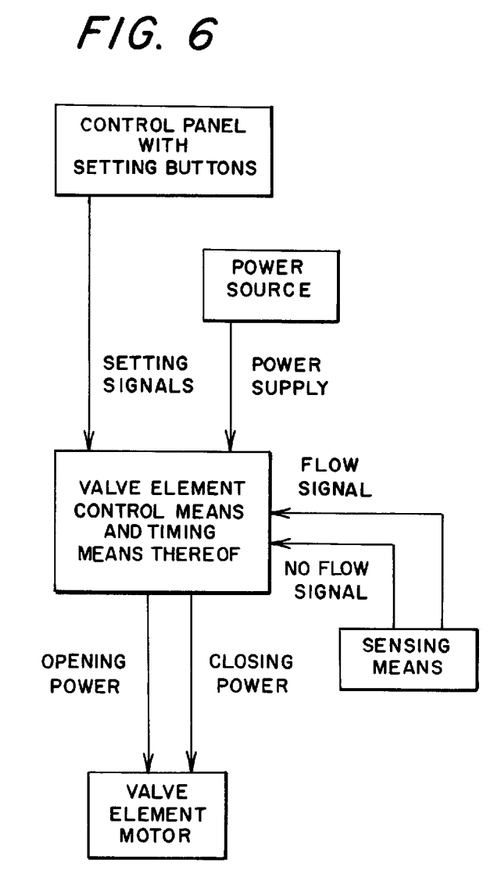
FIG. 6 is schematic diagram of the timed control valve including various features of the invention.

Assuming continued, uninterrupted use of the shower, at an end of the first predetermined period of time, the valve element control means 42 would cause the motor 38 to be activated to rotate the ball valve element 36 toward the closed position with the power to the motor 38 continuing until the ball valve element 36 is at the closed position as generally seen in FIG. 5. Those skilled in the electronic control art will be able to use any one of a number of alternative means to accomplish this objective. In one configuration, there would be provided a mechanical stop (not shown) to the ball valve element 36 to establish the closed position. The power to the motor 38 would be for a fixed period of time greater than that need to rotate the valve element 36 through 90 degrees so that it would continue for a short period with no effect thereon after the closed position is obtained. With such a configuration, the valve element 36 would also include a mechanical stop (not shown) for the open position and again the power for the fixed period of time would be provide by the flow of current in the opposite direction for reverse rotation until after the mechanical stop is reached to insure that the open position is obtained. In an alternative configuration, the power to the motor 38 would continue until either one of a pair of properly positioned limit switches (not shown) which are aligned with a portion of the ball valve element 36 are activated to sense the valve element 36 in the closed or the open position and to send a signal to the valve element control means 42 to discontinue the power to the motor 38. It should be clear that the use of power to the motor 38 only during the time needed to actually open or close the valve element will reduce the power consumption of the power source 40 and extend the life thereof.

In the basic form of the valve element control means 42 and timing means thereof, the second period of time will begin at the completion of the first period of time. Accordingly, after the end of the first period of time, the valve element control means 42 will cause the ball valve element 36 to be closed and prevent the normal flow of water therethrough even if the valve 20 remains opened. At the end of the second period of time, the valve element control means 42 will cause the ball valve element 36 to be opened for the next possible use of the shower. In fact, although this basic operation assumes continued use of the regular valve 20 until the end of the first period of time, the overall operation would be the same even if the user were to close the valve 20 prior to the end of the first period of time being reached. In such a case, with the valve 20 closed and the magnetic element 62 returned by the biasing spring 64 to the "no flow" position 63, the timing means would continue and would cause the valve element 36 to close at the end of the first period of time. Again, the valve element 36 would be opened at the end of the second period of time whether the valve 20 is again opened or not.

As mentioned above, in the preferred valve 10, when the ball valve element 36 is in the closed position, the hot water will not be able to flow at the "normal" rate to move the magnetic element 62 from the "no flow" position. However, as seen in FIG. 5, in order to prevent the user from being completely without any hot water when the ball valve element 36 is in the closed position, the design thereof, because of the designed gap or space surrounding the element 36, will allow some leakage thereby to provide a "reduced" flow when the valve 20 is opened which is well below the "normal" flow. The reduced flow rate might be as low as one-tenth of a gallon per minute but would enable the user to partially close the regular cold water valve 22 to obtain some minimal flow that is not totally cold water for a finaly rinse to complete the shower. With the reduced flow of the water caused by the ball valve element 36 being closed, the magnetic element 62 would be located at a "reduced flow" position 67 against the biasing of the biasing spring 64. In the configuration as thus explained, when the magnetic element 62 is in the reduced flow position 67, the reed switch 68 would be opened to provide an indication to the valve element control means 42 and the timing means thereof of that there is no longer at least the normal flow of the hot water through the valve 10.

Figure 7:
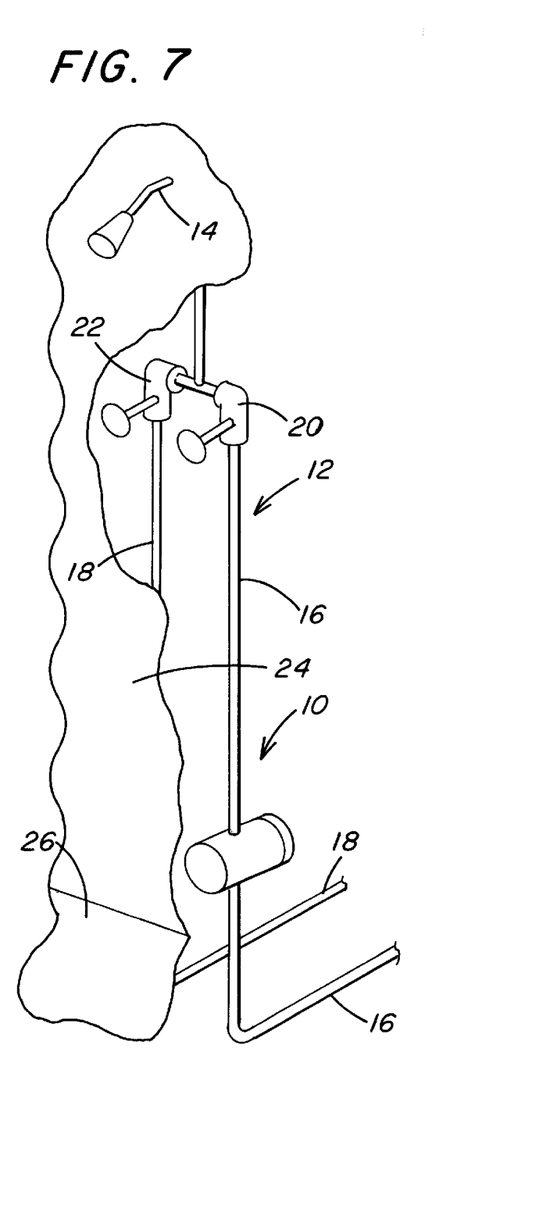
FIG. 7 is a fragmentary, perspective view of a typical shower installation like that of FIG. 1 with the preferred timed control valve installed at a different location within the system to demonstrate that a physically different orientation will not affect the overall operation thereof.

The preferred configuration of the magnetic element 62 and the biasing spring 64 causes the sensing means 60 to be able to function totally independent of the physical position or orientation of the valve 10 in the fluid piping system. The fluid and the biasing spring 64 will act on the magnetic element 62 in the same manner to establish the no flow position 63 or the flow position 65 or reduced flow position 67 no matter what the direction of the piping system or the fluid passing therethrough. For example, while the installation of FIG. 1 might be typical, there would be nothing in the operation of the valve 10 which would prevent it from being installed on a downwardly extending portion of the hot water pipe 16, as seen in FIG. 7, perhaps located in a linen close, if desired. The reliability and operation of the valve 10 would not be affected.

In either case, with the basic configuration for the valve 10 and the valve element control means 42 and the timing means thereof as described hereinabove, whenever the valve 10 is activated by the initial opening of the valve 20, the ball valve element 36 will eventually be closed at the end of the first period of time and remain closed until the end of the second period of time. The user might, for example, open the valve 20 for an initial rinsing of two minute, use the soap with no water for one minute, and then open the valve for four minutes to complete the shower. Although the shower would take only seven minutes, the shower 12 would, with the settings described above of ten minutes and fifteen minutes, be unavailable for the next use for another eighteen minutes.

It should be noted that the preferred valve 10 and the basic valve element control means 42 thereof can include an additional safety feature which can be used to insure that a malfunction in the shower will not result in any damage to the house. If the head of the household is sure that there will be a period of time, for example, such as a two weeks vacation, during which no one will be using the shower, the second button could be used to deactivate the second period of time feature. Just prior to going on vacation, the head of the household would use the off-on power button 50 to return the settings to zero. The first button of the setting button means 52 would be pushed once to establish the predetermined period of time at five minutes but the second button of the setting button means 52 would not be pushed at all. Failure to push the second button would basically deactivate the second period of time function. The purpose is to use the valve 10 in a manner that will only allow the ball valve element 36 to remain open for five minutes if there is any unauthorized use of the valve 20, the valve 20 has a massive failure, or the pipe down stream of the valve 10 ruptures. This setting, to prevent the valve 10 from reopening after having been closed, would insure that there would not be any uncontrolled massive loss of hot water that might severely damage the house. After the vacation, the head of the household can reactivate the valve 10 for normal use.

As mentioned above, those skilled in the electronic control art could configure the valve element control means and the timing means thereof in any number of ways that would be able to accomplish the overall objectives of preventing excessive use of the hot water. In fact, with an alternative configuration of the valve element control means and timing means thereof, alternative settings for the timing means would allow the preferred valve 10 with the same physical features to be used for other means to effectively control the use of water or other fluids passing therethrough.

For example, the same physical valve 10 as discussed above includes the basic valve control element means and timing means thereof that establishes the first predetermined period of time and second predetermined period of time that will cause the ball valve element 36 to be closed and later opened each time that the regular valve 20 is opened to establish normal flow therethrough. However, with an alternative valve control element and timing means therefor and a different control panel, the preferred valve 10 can be used in a manner which will not always cause the ball valve element 36 to be closed and reopened.

With the alternative valve control element and timing means thereof, a single button of the setting button means 52 could be used to establish the first predetermined period of time and an identical second predetermined period of time. The single button could, for example, be pushed twice to establish both periods of time at ten minutes. An alternative timing means incorporated in the printed circuit board would be of the type that would "count" forward when the flow sensing means 60 is activated and to "count" backward when the flow sensing means 60 is deactivated.

Accordingly, when the valve 20 is opened and the flow sensing means 60 detects normal flow, the timing means would begin to advance. If the user of the shower continues the normal flow of the hot water for the ten minutes, the timing means would cause the valve element control means to close the ball valve element 36. When the ball valve element 36 is closed, any flow therethrough would be below the normal flow even if the valve 20 were left open and the flow sensing means 60 would no longer be at the flow position 65. Whether at the no flow position 63 or the reduced position 67, the reed switch 68 would be opened and the sensing means 60 would be deactivated. When the sensing means 60 is deactivated after the ball valve element 36 is closed, the alternative timing mean would begin to count down and would continue until the ten minutes has expired and the ball valve element 36 would be opened for the next use. With the alternative timing means, after the first predetermined period of time as set has been reached to close the ball valve element 36, the timing means would, by design, automatically count down for the identical second predetermined period of time totally independent of the position or activation of the flow sensing means 60.

However, if the valve 20 were closed before the end of the first predetermined of time and the sensing means 60 became deactivated, the deactivation of the sensing means 60 would cause the alternative timing means to begin to count down. Accordingly, if the user used the shower for three minutes and then closed the valve 20 for two minutes, the timing means would advance for three minutes and then reverse for two minutes. When the user again opens the valve 20 to activate the sensing means 60, the timing means would again advance and, if not interrupted by the valve 20 being closed again, would continue for nine minutes until the end of the originally selected first time period is reached. In such a case, the timing means would again close the ball valve element 36 until the end of the second predetermined period of time of ten minutes. Consequently, with this alternative valve element control means and timing means thereof, the first predetermined period of time would be the original set time of ten minutes plus the additional time that the user manually reduced the flow below the normal flow by closing the valve 20. The second predetermined period of time would be ten minutes and would begin at the end of the first predetermined period of time and the closing of the ball valve element 36 and would continue for the ten minutes at which time the ball valve element 36 would be reopened.

If the user, upon continuing the shower after the two minutes discussed above, only used the shower, for example, another eight minutes, the end of the first period of time would not be reached and the alternative valve control means and the timing means thereof would not close the ball valve element 36. The timing means would again begin to count down. If the shower is used again before the timing means reverses to zero, the first predetermined period of time would be resumed. If, in the unusual occasion a second user were to begin the next use too soon, the continuation of the first predetermined period of time might cause the second user to be restricted to a shorter than desired shower. However, in a more likely case, since the first user did not use the entire ten minutes the first time, the timing means would require a shorter amount of time to return to zero and the second user would be able to begin the next shower in the normal manner for the first predetermined of time of ten minutes.

Consequently, while the basic valve element control means 42 and timing means thereof for the preferred timed control valve 10 as discussed above will result in the ball valve element 36 being closed and reopened each time the shower is used, the alternative valve element control means and timing means thereof would encourage usage that would not always result in the ball valve element being closed and reopened. While the basic valve element control means will, with the same ten minute settings, require the second use to be delayed until the end of both ten minute periods as set, the alternative configuration would encourage more conservation of the hot water and allow a sooner second use of the shower if the first user takes a shorter shower. While the basic valve element control means would only require the additional operating power when the ball valve element 36 is being closed or reopened, the alternative valve element control means would use the additional operating power if needed but might not actually use this additional operating power because the ball valve element might not actually be closed and then reopened.

The valve 10 having the alternative valve element control means and the timing means thereof could also be provided with the safety feature that would prevent the ball valve element 36 from being reopened if desired. In fact, because of the operation of the alternative valve element control means, the basic valve 10 would be capable of being utilized for a number of purposes other than simply for conserving hot water. For this purpose, the control panel 46 would include in the setting button means 52 a safety button that, when selectively activated, would prevent the ball valve element 36 from being reopened, after having been closed, until the head of the household resets the entire valve 10. With such a setting for the valve 10 with the alternative valve element control means, the valve 10 would be appropriately employed on a number of other systems for safety purposes.

For example, the valve 10 could be used on any fluid system that would be expected to have a "limited" use but might be subject to failure that could result in uncontrolled use or loss of the fluid. If the fluid system is normally operated in a "limited" manner where the fluid will not be used for any extended period of time, the timing button could be set to establish a first time that is greater than the expected "limited" time and the safety button would be activated. Consequently, the valve 10 would be set to serve as a safety device so that the ball valve element 36 would only close if the system were to malfunction and be in continuous use beyond the "limited" time. Once closed, because of the activation of the safety button, the alternative valve element control means would cause the ball valve element 36 to remain closed and not reopen after the ball valve element 36 has been closed.

This safety feature for the valve 10 could be employed in various water systems in the normal household in a manner which would tend to minimize or prevent expensive damage that could result from a rare but significant failure of one of the systems. For example, it has been found that the hot water pipes of some clothes washers tend to age and deteriorate to the point of possible failure. The use of the preferred valve with this alternative valve element control means could protect against the damage that might result from such a failure. The settings for the alternative valve control element would depend on the operation of the clothes washer. After determining from the various wash cycles of the clothes washer what would be the longest period of time that could be expected for continuously using the hot water, the first predetermined period of time would be set at a longer period of time than would be expected. Accordingly, during any normal use, the alternative valve element control means would not be activated by the timing means thereof to close the ball valve element 36. However, if there were a failure of the hot water pipe, the normal flow would be continuous and the ball valve element 36 would be closed at the end of the first predetermined period of time. With the settings for the valve 10 in such a system including the activation of the safety button, once the ball valve element 36 is closed, it would be prevented from being opened until the entire system is reset. There might be some flood damage from such a failure of the hot water pipe but the valve 10 would clearly and significantly minimize such damage.

For another example, it is not uncommon for older hot water heaters to eventually deteriorate and have a tank wall failure. Such a failure would produce significant flooding which would continue until detected by some member of the household and the entire household water system is shut down to discontinue the supply of water to the tank. To minimize such a failure, the valve 10 with the alternative valve element control means and timing means thereof would be used like that employed with the clothes washer but would be installed in the cold water supply pipe for the hot water heater. The first predetermined period of time might have to be established after some analysis or experimentation at a sufficiently long period of time that it would not be activated under normal uses. For example, if the various uses of hot water in the house would not be expected to result in any continuous use thereof in excess of twenty-five minutes, the control panel would be used to set the first predetermined period of time at twenty-five minutes. As a result, under normal conditions the ball valve element 36 would not be closed but the safety button would again be used to prevent the ball valve element from being reopened if a hot water tank failure were to occur.

In some of the embodiments described herein above, the second predetermined period of time would begin at the end of the first predetermined period of time whether the valve down stream is left open or not and at the end of the second predetermined period of time the ball valve element 36 would be reopened. In other embodiments described hereinabove, the second period of time generally corresponds to the first period of time during which the valve down stream was opened and would cause the ball valve element 36 to again be reopened at the end of the second period of time even if the valve down stream were to remain open. However, in the special configurations where it is expected that some failure might occur, the various embodiments employ some means for setting the device to prevent the second predetermined period of time from effectively allowing the ball valve element 36 to be reopened.

Figure 8:
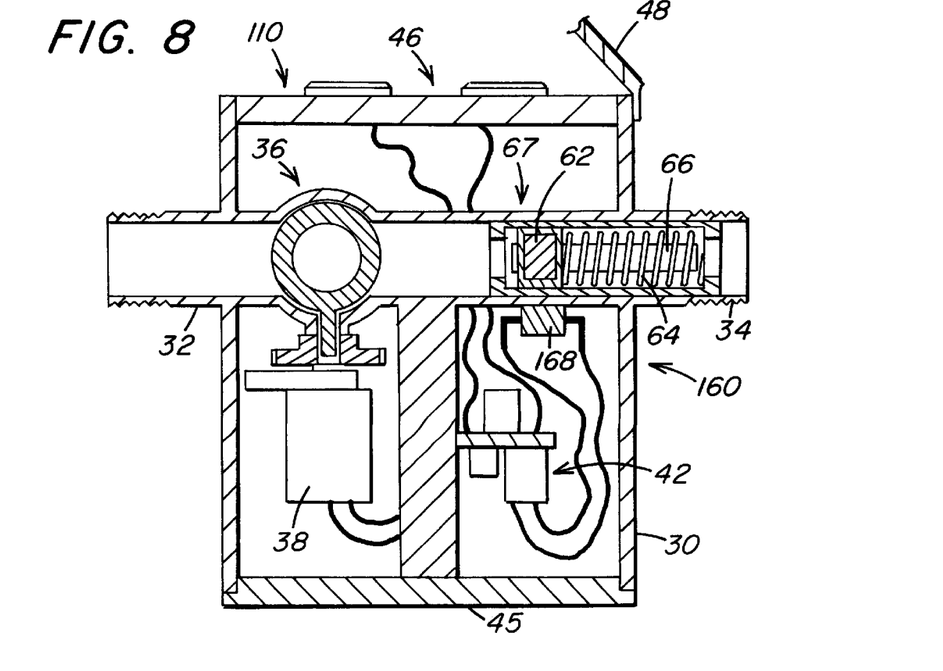
FIG. 8 is a view like that of FIG. 5 of an alternative timed control valve which allows a reduced flow of fluid therethrough when closed and includes various features of the invention.

However, as seen in FIG. 8, another alternative valve 110 is configured to physically function in a manner that is similar to the valve 10 with the alternative valve control means and timing means therefor but with an alternative sensing means 160. In the alternative sensing means 160, the reed switch 168 is physically located to be closed when there is at least a reduced flow through the flow line. With the components of the sensing means 160 not being drawn to scale, it should be understood that the reed switch 168 is configured to remain closed for all flows above the reduced flow. Accordingly, when there is any opening down stream of the valve 110, whether there is normal flow, a greater flow or a reduced flow, the reed switch 160 will be closed and the first predetermined period of time would begin. With the valve 110, the first predetermined period of time would again be set according to the possible use, such as a possible the failure of a clothes washer or a hot water heater, and would only be expected to cause the ball valve element 36 to be closed if the first predetermined period of time were exceeded.

However, the second predetermined period of time in the valve 110 would not be activated and would not be configured to begin with the closing of the ball valve element 36. The second predetermined period of time would not begin until the reed switch 168 is opened and, with the ball valve element 36 being configured, because of the designed gap or space surrounding the element 36, to allow the reduced flow therethrough even when closed, the magnetic element 62 would remain at least at the reduced flow position 67 to cause the reed switch 168 to remain closed as long as there was any opening down stream of the valve 110. Accordingly, with the valve 110, there would be no need, in the special conditions discussed above, to positively set the valve element control means to prevent the ball valve element 36 from being reopened. This would occur automatically if there is at least a reduced flow continuously being sensed through the valve 110 and the water lines thereof. As long as there was at least the reduced flow in the lines, which would continue to occur even if the ball valve element 36 were closed, the second predetermined period of time would not begin and the ball valve element 36 would remain closed. As a result, the second predetermined second period of time would only begin after the flow is completely stopped by the closing of a valve either up stream or down stream of the valve 110. Only then would the magnetic element 62 be moved by the biasing means 64 from the reduced flow position 67 to cause the reed switch 168 to be opened. Finally, depending on the particular installation, it would be possible for the second predetermined period of time to be set at zero to allow the ball valve element 36 to open as soon as the flow is stopped or at some other selected time to delay the opening of the ball valve element 36 until after the flow has been stopped.

In any case, it should be clear that additional alterations could be made to the valve 10 and the valve 110 while remaining within the scope of the invention as claimed. For example, the valve 110 includes the flow sensing means 160 which has been altered by repositioning the reed switch 168 but it should be clear that any number of changes could also be made to the dimensions of the magnetic element or the outlet portion or the force of the biasing means to establish the desired flow levels at which the reed switch would be closed or reopened. While the preferred valves 10 and 110 include sensing means 60 and 160 that are disposed in the outlet portion 34, there is nothing that would prevent them from being installed in the inlet portion 32 to function in the same manner and for the same purpose. As mentioned above, it is well within the capabilities of those skilled in the electronic control art to devise and design other valve element control means and timing means thereof which would be used to control the timed control valve 10 in the same manner as claimed. While the preferred valves 10 and 110 utilize the motor and ball valve element configuration to minimize the possible power use, alternative valve elements and closing means therefor could be employed to accomplish the same objectives. Clearly, any number of changes could be made to the preferred valve 10, the preferred valve 110 and the alternative components thereof by those skilled in the art without departing from the scope of the invention as claimed.

What is claimed is:

1. A timed control valve for being installed in a fluid line upstream from a regular user-controlled valve which is capable of being adjustably opened to allow a fluid to flow through the fluid line and closed to prevent the fluid from flowing through the fluid line, the regular user-controlled valve in the fluid line being capable of being opened to allow at least a normal flow of the fluid therethrough, said control valve comprising:

a housing having an inlet portion for being connected to the fluid line for receipt of the fluid therefrom and an outlet portion for being connected to the fluid line for the discharge of the fluid thereto toward the regular user-controlled valve;

a valve element in said housing for normally being in an open position for at least the normal flow of the fluid to pass therethrough and for alternatively being in a closed position for preventing the normal flow of the fluid therethrough;

sensing means disposed at one of said inlet portion and said outlet portion for sensing at least the normal flow of the fluid;

valve element control means for controlling said open position and said closed position of said valve element;

said valve element control means including timing means;

said sensing means being operable connected to said valve control means to cause a beginning of a first predetermined period of time of said timing means when at least the normal flow is sensed by said sensing means;

said valve element control means causing said valve element to be moved to said closed position at least at an end of said first predetermined period of time;

selective opening means for opening said valve element after said valve element has been closed by said valve element control means to prevent at least the normal flow from being sensed by said sensing means;

said selective opening means including said timing means having a second predetermined period of time beginning after said end of said first predetermined time; and said valve element control means causing said valve element to be opened at an end of said second predetermined period of time.

2. The timed control valve as set forth in claim 1, wherein said timing means includes adjustment means for selectively adjusting said first predetermined period of time and for selectively adjusting said second predetermined period of time.

3. The timed control valve as set forth in claim 1, wherein said valve element in said closed position allows a reduced flow of the fluid therethrough which is less than the normal flow.

4. The timed control valve as set forth in claim 3, wherein said sensing means is only capable of sensing the flow of the fluid therethrough which is at least the normal flow and is above the reduced flow and said second predetermined period of time begins at the end of said first predetermined period of time.

5. The timed control valve as set forth in claim 1, wherein said sensing means includes a magnetic element disposed in said one of said inlet portion and said outlet portion, said magnetic element is normally biased by biasing means in a direction opposite the normal flow, said magnetic element is caused to move at least to a predetermined position in said one of said inlet portion and said outlet portion against said biasing means by the normal flow of the fluid acting thereon, said sensing means includes reed switch means adjacent to said predetermined position in said one of said inlet portion and said outlet portion, and said magnetic element at said predetermined position causes said reed switch means to be closed to provide indication of at least the normal flow to said valve element control means.

6. The timed control valve as set forth in claim 1, wherein said sensing means is for sensing at least a reduced flow of the fluid which is less than the normal flow, said sensing means is operably connected to said valve element control means to cause said beginning of said first predetermined period of time of said timing means when said at least said reduced flow is sensed by said sensing means, and said valve element in said closed position allows said at least said reduced flow therethrough.

7. The timed control valve as set forth in claim 6, wherein said sensing means includes a magnetic element disposed in said one of said inlet portion and said outlet portion, said magnetic element is normally biased by biasing means in a direction opposite the normal flow, said magnetic element is caused to move at least to a predetermined position in said one of said inlet portion and said outlet portion against said biasing means by said at least said reduced flow of the fluid acting thereon, said sensing means includes reed switch means adjacent to said predetermined position in said one of said inlet portion and said outlet portion, and said magnetic element at said predetermined position causes said reed switch means to be closed to provide indication of said at least said reduced flow to said valve element control means.

8. The timed control valve as set forth in claim 7, wherein said selective opening means includes said second predetermined period of time beginning when said at least said reduced flow is no longer being sensed by said sensing means.

9. The timed control valve as set forth in claim 1, wherein said sensing means is disposed at said outlet portion.

10. The timed control valve as set forth in claim 1, wherein said valve element control means is electrically operated.

11. The timed control valve as set forth in claim 10, wherein said sensing means is electrical and said operable connection between said sensing means and said valve element control means is electrical.

12. A timed control valve for being installed in a fluid line upstream from a regular user-controlled valve which is capable of being adjustably opened to allow a fluid to flow through the fluid line and closed to prevent the fluid from flowing through the fluid line, the regular user-controlled valve in the fluid line being capable of being opened to allow at least a normal flow of the fluid therethrough, said control valve comprising:

a housing having an inlet portion for being connected to the fluid line for receipt of the fluid therefrom and an outlet portion for being connected to the fluid line for the discharge of the fluid thereto toward the regular user-controlled valve;

a valve element in said housing for normally being in an open position for at least the normal flow of the fluid to pass therethrough and for alternatively being in a closed position for preventing the normal flow of the fluid therethrough;

valve element control means for controlling said open position and said closed position of said valve element;

sensing means disposed at one of said inlet portion and said outlet portion for sensing at least the normal flow of the fluid;

said sensing means being operably connected to said valve element control means;

said one of said inlet portion and said outlet portion with said sensing means disposed thereat being capable of being physically oriented in any direction while said sensing means remains capable of sensing at least the normal flow therethrough;

said sensing means including a magnetic element disposed in said one of said inlet portion and said outlet portion;

said magnetic element being normally biased by biasing means in a direction opposite the normal flow;

said magnetic element being caused to move at least to a predetermined position in said one of said inlet portion and said outlet portion against said biasing means by at least the normal flow of the fluid acting thereon;

said sensing means including reed switch means adjacent to said predetermined position in said one of said inlet portion and said outlet portion;

said magnetic element at said predetermined position causing said reed switch means to be closed to provide indication of at least the normal flow to said valve element control means;

said valve element control means including timing means;

said sensing means being operably connected to said timing means to cause a beginning of a first predetermined period of time of said timing means when at least the normal flow is sensed by said sensing means;

said valve element control means causing said valve element to be moved to said closed position at an end of said first predetermined period of time; and selective opening means for opening said valve element after said valve element has been closed by said valve element control means.

13. The timed control valve as set forth in claim 12, wherein said selective opening means includes said timing means having a second predetermined period of time beginning at said end of said first predetermined period of time, said valve element control means causes said valve element to be opened at an end of said second predetermined period of time, and said timing means includes adjustment means for selectively adjusting said first predetermined period of time and for selectively adjusting said second predetermined period of time.

14. The timed control valve as set forth in claim 12, wherein said sensing means is for sensing at least a reduced flow of the fluid which is less than the normal flow, said sensing means is operably connected to said valve control means to cause said beginning of said first predetermined period of time of said timing means when said at least said reduced flow is sensed by said sensing means, and said valve element in said closed position allows said at least said reduced flow therethrough.

15. The timed control valve as set forth in claim 14, wherein said magnetic element is caused to move at least to said predetermined position in said one of said inlet portion and said outlet portion against said biasing means by said at least said reduced flow of the fluid acting thereon and said magnetic element at said predetermined position causes said reed switch means to be closed to provide indication of said at least said reduced flow to said valve element control means.

16. The timed control valve as set forth in claim 15, wherein said selective opening means includes said timing means having a second predetermined period of time beginning when said at least said reduced flow is no longer being sensed by said sensing means and said valve element control means causes said valve element to be opened at an end of said second predetermined period of time.

17. The timed control valve as set forth in claim 12, wherein said valve element in said closed position allows a reduced flow of the fluid therethrough which is less than the normal flow and said sensing means is only capable of sensing the flow of the fluid therethrough which is above the reduced flow.

18. The timed control valve as set forth in claim 12, wherein said valve element control means is electrically operated, said sensing means is electrical and said operable connection between said sensing means and said valve element control means is electrical.

19. The timed control valve as set forth in claim 12, wherein said magnetic element of said sensing means is disposed in said outlet portion.

20. A method of limiting the amount of time of at least a normal flow of a fluid through a fluid line, the fluid line including a regular user-controlled valve which is capable of being adjustably opened to allow the fluid to flow through the fluid line and closed to prevent the fluid from flowing through the fluid line, the regular user-controlled valve in the fluid line being capable of being opened to allow at least the normal flow of the fluid therethrough, said method comprising the steps of:

sensing at least the normal flow of the fluid through a portion of the fluid line;

said sensing being capable of occurring independent of the physical orientation of said portion of the fluid line;

stopping the normal flow toward the regular user-controlled valve at least at an end of a first predetermined period of time of continuous said sensing of at least the normal flow; and said stopping of the normal flow being accomplished by a valve element located in the fluid line up stream of the regular user-controlled valve.

21. The method as set forth in claim 20, wherein said sensing and said stopping are produced by electrically operated means.

22. The method as set forth in claim 20, wherein said stopping of the normal flow allows a reduced flow of the fluid which is less than the normal flow and said sensing occurs at said reduced flow of the fluid, further including the step of allowing at least the normal flow when the regular user-controlled valve is opened at an end of a second predetermined period of time beginning after there is no said sensing of said reduced flow.

23. The method as set forth in claim 20, further including the step of allowing at least the normal flow when the regular user-controlled valve is opened at an end of a second predetermined period of time beginning with said stopping of the normal flow.

24. The method as set forth in claim 23, wherein said stopping of the normal flow allows a reduced flow of the fluid which is less than the normal flow.

25. The method as set forth in claim 24, wherein said sensing does not occur during said reduced flow of the fluid.

26. The method as set forth in claim 23, further including the step of adjusting a length of said first predetermined period of time and a length of said second predetermined period of time.

* * * * *